(12) United States Patent
Arora et al.

(10) Patent No.: US 10,029,736 B1
(45) Date of Patent: Jul. 24, 2018

(54) ROOF FRAME INCLUDING A BRACE REINFORCING ARCHED MEMBERS

(71) Applicant: Ford Global Technologies, LLC, Dearborn, MI (US)

(72) Inventors: Rahul Arora, Birmingham, MI (US); Hamza Mohamed Baccouche, Ann Arbor, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 66 days.

(21) Appl. No.: 15/407,672

(22) Filed: Jan. 17, 2017

(51) Int. Cl.
*B60R 13/07* (2006.01)
*B62D 25/06* (2006.01)
*B62D 27/02* (2006.01)

(52) U.S. Cl.
CPC ........... *B62D 25/06* (2013.01); *B62D 27/023* (2013.01)

(58) Field of Classification Search
CPC ....... H01L 2924/00; H01L 2224/48247; H01L 2224/45147; H01L 2224/48465; H01L 2224/73265; Y02B 10/20; Y02B 10/12; H02S 20/23; Y02E 10/44; E04H 15/40
USPC ........................................................ 296/210
See application file for complete search history.

(56) References Cited

U.S. PATENT DOCUMENTS

| | | | | |
|---|---|---|---|---|
| 1,768,368 A | * | 6/1930 | Menzies ................. | B62D 25/06 296/210 |
| 1,828,743 A | * | 10/1931 | Lovell .................. | B62D 23/005 296/203.01 |
| 2,147,059 A | * | 2/1939 | Randall ............... | B60R 13/0212 296/211 |
| 2,389,907 A | * | 11/1945 | Helmuth .............. | B62D 23/005 280/793 |
| 3,971,588 A | * | 7/1976 | Bauer .................. | B62D 23/005 280/784 |
| 4,045,075 A | * | 8/1977 | Pulver .................... | B62D 21/08 280/798 |
| 4,355,844 A | * | 10/1982 | Fantini Muzzarelli ........... | B62D 23/005 280/784 |
| 4,426,101 A | * | 1/1984 | Dyer ....................... | B60G 9/00 280/124.109 |

(Continued)

FOREIGN PATENT DOCUMENTS

| | | |
|---|---|---|
| DE | 10347847 B3 | 4/2005 |
| DE | 102004058345 A1 | 6/2006 |
| JP | H07187007 A | 7/1995 |

OTHER PUBLICATIONS

Boeriu, Horatiu, "The ideas behind the BMW Vision Next 100 as explained by BMW designers," www.binwblog.com ; Mar. 12, 2016, 5 pages.

*Primary Examiner* — Kiran B Patel
(74) *Attorney, Agent, or Firm* — Jason A. Roger; Bejin Bieneman PLC

(57) ABSTRACT

A vehicle structure includes a body and a roof frame. The roof frame includes two side members, two cross members and a brace. The two side members are spaced from each other and both are connected to the body. The two cross members are spaced from each other and both extend from one side member to the other side member. The cross members arch toward each other and each has an apex between the side members. The brace is connected to the apexes and extends from one side member to the other side member.

20 Claims, 6 Drawing Sheets

(56) References Cited

U.S. PATENT DOCUMENTS

| | | | | |
|---|---|---|---|---|
| 4,533,172 A * | 8/1985 | Oliver | B62D 21/12 | 296/193.03 |
| 4,626,026 A * | 12/1986 | Hasegawa | B60J 7/11 | 16/364 |
| 4,660,345 A * | 4/1987 | Browning | B62D 21/08 | 164/63 |
| 4,856,843 A * | 8/1989 | Elliott | B60P 3/42 | 160/213 |
| 5,094,313 A * | 3/1992 | Mauws | B62D 21/08 | 180/210 |
| 5,297,837 A * | 3/1994 | Burst | B60J 7/1256 | 296/107.1 |
| 5,676,291 A * | 10/1997 | Wolf | B60R 9/00 | 224/309 |
| 5,704,644 A * | 1/1998 | Jaggi | B60K 1/00 | 180/311 |
| 5,848,853 A * | 12/1998 | Clenet | B62D 23/005 | 280/781 |
| 6,296,301 B1 * | 10/2001 | Schroeder | B62D 29/046 | 296/187.02 |
| 6,302,478 B1 * | 10/2001 | Jaekel | B23K 26/38 | 296/203.04 |
| 6,371,767 B1 * | 4/2002 | Libby | G09B 19/0069 | 296/205 |
| 7,044,535 B2 * | 5/2006 | Durand | B62D 23/005 | 296/203.01 |
| 7,175,200 B1 * | 2/2007 | Obershan | B60R 21/13 | 280/755 |
| 7,380,805 B1 * | 6/2008 | Turner | B60G 3/20 | 280/124.13 |
| 8,398,160 B2 | 3/2013 | Baumann | | |
| 8,439,432 B2 | 5/2013 | Nusier et al. | | |
| 8,746,719 B2 * | 6/2014 | Safranski | B60G 3/14 | 280/124.148 |
| 9,033,401 B1 * | 5/2015 | Donabedian | B62D 27/026 | 296/187.02 |
| 9,187,128 B2 * | 11/2015 | Koberstein | B62K 5/01 | |
| 2004/0080188 A1 * | 4/2004 | Igarashi | B62D 23/00 | 296/203.04 |
| 2005/0006157 A1 * | 1/2005 | Shioji | E02F 9/163 | 180/89.13 |
| 2005/0280280 A1 * | 12/2005 | Heselhaus | B60J 1/183 | 296/107.15 |
| 2009/0250976 A1 | 10/2009 | Yang | | |
| 2010/0173126 A1 * | 7/2010 | Malek | B32B 15/08 | 428/138 |
| 2013/0049398 A1 * | 2/2013 | Park | B60P 3/341 | 296/171 |
| 2013/0175828 A1 * | 7/2013 | White | B62D 25/04 | 296/203.03 |
| 2013/0285417 A1 * | 10/2013 | Yoshida | B62D 25/06 | 296/210 |
| 2015/0266518 A1 * | 9/2015 | Donabedian | B62D 27/026 | 296/210 |
| 2016/0046241 A1 * | 2/2016 | Crismon | B60J 7/106 | 224/326 |
| 2016/0107702 A1 * | 4/2016 | Stein | B62D 21/09 | 280/781 |
| 2017/0225714 A1 * | 8/2017 | Ito | B62D 23/005 | |
| 2017/0225715 A1 * | 8/2017 | Kobayashi | B62D 23/005 | |

* cited by examiner

ROOF FRAME INCLUDING A BRACE REINFORCING ARCHED MEMBERS

BACKGROUND

A vehicle may include a vehicle body defining a plurality of door openings. The vehicle body may include a roof, a floor, and a plurality of pillars. The pillars may be spaced from each other by the door openings. In other words, the pillars may be disposed on opposite sides of the door openings. Typically, the pillars include a B-pillar separating two door openings and extending from the floor to the roof of the vehicle body. The pillars also include an A-pillar and a C-pillar spaced from the B-pillar on opposite sides of the door openings.

DETAILED DESCRIPTION

Figure 1:
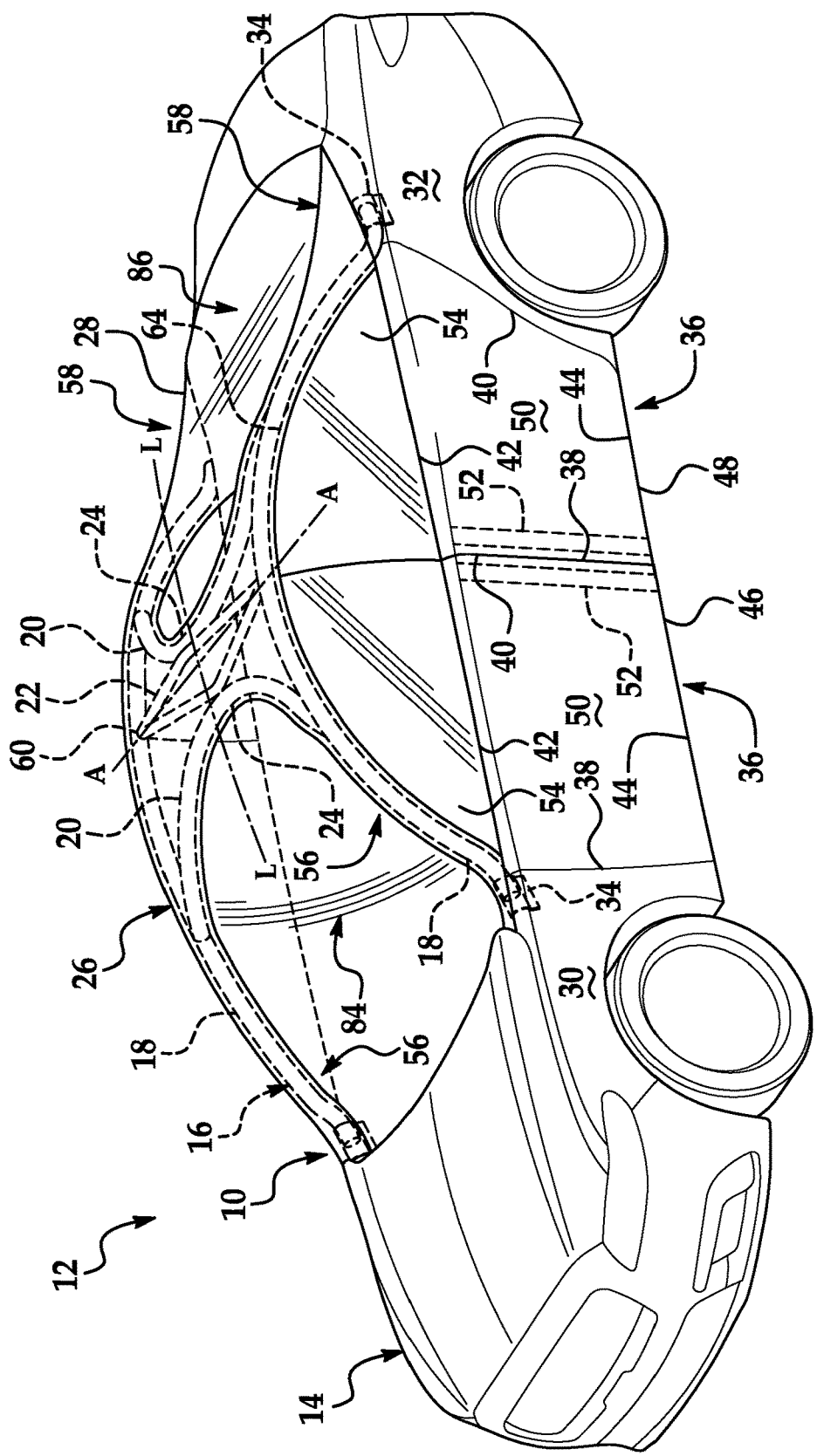
FIG. 1 is a perspective view of a vehicle having a vehicle structure including a body and a roof assembly supported on the body.

With reference to the Figures, wherein like numerals indicate like parts throughout the several views, a vehicle structure 10 of a vehicle 12 includes a body 14 and a roof frame 16. The roof frame 16 includes two side members 18, two cross members 20, and a brace 22. The two side members 18 are spaced from each other and both are connected to the body 14. The two cross members 20 are spaced from each other and both extend from one side member 18 to the other side member 18. The cross members 20 arch toward each other and each has an apex 24 between the side members 18. The brace 22 is connected to the apexes 24 of the cross members 20 and extends from one side member 18 to the other side member 18.

During a vehicle impact, e.g., a side impact, the roof frame 16 may be impacted and be biased toward occupant compartment of the vehicle 12. When the roof frame 16 is impacted, the roof frame 16 manages the force of the impact to assist in absorbing the energy of the vehicle impact and reducing intrusion into the occupant compartment. Since the brace 22 extends from one side member 18 to the other side member 18, the cross members 20 and the brace 22 reinforce the side members 18. Specifically, when one of the side members 18 is impacted, the cross member 20 and/or the brace 22 distribute the forces to the other side member 18 such that the other side member 18 reinforces the impacted side member 18. Further, because the brace 22 is connected to the apexes 24 of each cross member 20, the brace 22 may assist in distributing the force of the impact throughout the roof frame 16, as set forth below, which may increase the roof crush strength of the roof frame 16. The roof crush strength requirements are standardized by the National Highway Traffic Safety Administration (NHTSA) and the Insurance Institute of Highway Safety (IIHS).

This reinforcement by the cross members 20 and the brace 22 may allow for the elimination of a B-pillar, which may assist in providing a panoramic view for the occupants. For example, the vehicle 12 shown in FIGS. 1-6 does not include a B-pillar. The cross members 20 arching towards each other may assist in providing a panoramic view for the occupants. A panoramic view, for example, may be useful in an autonomous vehicle.

The vehicle 12 may, for example, be any suitable type of automobile. The vehicle 12 may include two sides spaced from each other along a lateral axis A of the roof frame 16. The roof frame 16 may include a longitudinal axis L extending transverse to the lateral axis A. The two sides of the vehicle 12 may extend transverse to the lateral axis A. For example, the two sides may each be elongated along the longitudinal axis L.

The vehicle 12 may include the vehicle structure 10 including the body 14 and a roof assembly 26 connected to the body 14, as shown in FIG. 1. The roof assembly 26 includes the roof frame 16 and exterior panels 28 supported on the roof frame 16, as set forth further below.

With reference to FIG. 1, the body 14 may include a front fender 30 and a rear fender 32 spaced from the front fender 30 along the longitudinal axis L. Specifically, the body 14 may include one front fender 30 and one rear fender 32 on each side of the vehicle 12. In other words, the body 14 may include one front fender 30 and one rear fender 32 on one side of the vehicle 12 and another front fender 30 and another rear fender 32 on the other side of the vehicle 12. The front fenders 30 are spaced from each other along the lateral axis A, and the rear fenders 32 are spaced from each other along the lateral axis A.

The body 14 may include a plurality of brackets 34 connecting the roof frame 16 to the fenders 30, 32. One bracket 34 may be connected to each fender. For example, each side of the vehicle 12 may include two brackets 34, e.g., one bracket 34 attached to the front fender 30 and another one bracket 34 attached to the rear fender 32. Each bracket 34 may extend from the body 14, i.e., the fenders 30, 32, towards the roof assembly 26 at any suitable angle. The brackets 34 may assist in connecting the body 14 to the roof assembly 26, as set forth below. The brackets 34 may be connected to each fender by any suitable manner, e.g., spot welding, riveting, or etc.

The body 14 may include at least one door opening 36 disposed between the front fender 30 and the rear fender 32 on each side of the vehicle 12. The body 14 may include at least one vehicle door 46, 48 extending across the door opening 36 on each side of the vehicle 12. The vehicle door 46, 48 on each side of the vehicle 12 may extend from the front fender 30 to the rear fender 32. The vehicle door 46, 48 may be hinged to, i.e. rotate about, any suitable component of the body 14 defining the door opening 36, e.g., the front fender 30, the rear fender 32, etc.

The vehicle door 46, 48 may include a front side 38, a rear side 40 spaced from the front side 38, and a top side 42 and a bottom side 44 spaced from each other and extending to the front side 38 and the rear side 40 of the vehicle door 46, 48.

The vehicle 12 may include any suitable number of vehicle doors on each side of the vehicle 12. The two sides of the vehicle 12 may have the same number of doors. For example, the body 14 may include a front door 46 extending from the front fender 30 partially to the rear fender 32 along the longitudinal axis L and a rear door 48 extending from the front door 46 to the rear fender 32 along the longitudinal axis L, as shown in FIG. 1. In other words, the front side 38 of the front door 46 may be adjacent to the front fender 30, and the rear side 40 of the front door 46 may be spaced from both the front fender 30 and the rear fender 32. Additionally, the front side 38 of the rear door 48 may be adjacent to the rear side 40 of the front door 46 and the rear side 40 of the rear door 48 may be adjacent to the rear fender 32, as shown in FIG. 1.

The vehicle door 46, 48 includes a door inner (not shown) and a door outer 50 attached to the door inner. The door outer 50 is fixed to the door inner, e.g., may be flanged to the door inner, along the sides of the vehicle door 46, 48. Specifically, the door outer 50 may be fixed to the door inner along the front, rear, and bottom sides 38, 40, 44 of the vehicle door 46, 48. The door outer 50 is spaced from the occupant on the vehicle door 46, 48, e.g., disposed on an outboard side of the vehicle door 46, 48. The door outer 50 extends from the front side 38 to the rear side 40, and from the top side 42 to the bottom side 44.

The door inner is disposed between the door outer 50 and the occupant, i.e., on an inboard side of the vehicle door 46, 48. The door inner extends from the front side 38 to the rear side 40, and from the top side 42 to the bottom side 44.

The door outer 50 and the door inner define a cavity (not shown) therebetween. In other words, the door outer 50 may be spaced from the door inner between the sides of the vehicle door 46, 48.

With reference to FIG. 1, the vehicle door 46, 48 may include a reinforcing member 52 disposed in the cavity. The reinforcing member 52 may extend from the top side 42 to the bottom side 44 of the vehicle door 46, 48. The reinforcing member 52 may be spaced from both the front fender 30 and the rear fender 32. For example, the reinforcing member 52 of the front door 46 may be disposed on the rear side 40 of the front door 46, and the reinforcing member 52 of the rear door 48 may be disposed on the front side 38 of the rear door 48. The reinforcing member 52 of the front door 46 is adjacent to the reinforcing member 52 of the rear door 48. The reinforcing member 52 may be the same or different material as the roof frame 16, as set forth below.

The vehicle door 46, 48 may include a glass panel 54 extending from the front side 38 to the rear side 40 of the vehicle door 46, 48. The glass panel 54 may be able to slide relative to the vehicle door 46, 48, e.g., the top side 42, to retract into the vehicle door 46, 48. In other words, the glass panel 54 may be raised and lowered.

With reference to FIG. 1, the roof frame 16 may extend along the longitudinal axis L from the front fender 30 to the rear fender 32 of the vehicle 12. Additionally, the roof frame 16 may extend along the lateral axis A from one side to the other side of the vehicle 12. In other words, the roof assembly 26 may extend to each of the fenders 30, 32.

With continued reference to FIG. 1, the roof frame 16 may include a plurality of pillars on each side of the vehicle 12 spaced from each other by the door opening 36. Specifically, portions of the side members 18 may be the pillars. The roof may have the same number of pillars on each side of the vehicle 12. The pillars may be disposed on opposite sides of the door opening 36. In other words, the pillars may be disposed adjacent to the fenders 30, 32, i.e., the front fender 30 and the rear fender 32. For example, the pillars may include an A-pillar 56 adjacent to the front fender 30 and a C-pillar 58 adjacent to the rear fender 32. In other words, the A-pillar 56 may be spaced from the C-pillar 58 on the opposite side of the door opening 36.

With continued reference to FIG. 1, the roof assembly 26 may include the roof frame 16 and at least one exterior panel 28 connected to the roof frame 16. The exterior panel 28 may cover the roof frame 16. In other words, the exterior panel 28 may extend along the roof frame 16 from the front fender 30 to the rear fender 32 and may extend across the roof frame 16 from one side to the other side. The exterior panel 28 may be connected to the roof frame 16 in any suitable fashion, e.g., welding, screws, rivets, etc.

The exterior panel 28 may be formed of any suitable type of material. For example, the exterior panel 28 may be formed of steel. Alternatively, the exterior panel 28 may be formed of aluminum, fiberglass, carbon fiber, or any other suitable type of material.

The exterior panel 28 may be a single continuous unit, e.g., a single piece of metal. Alternatively, the exterior panel 28 may include a plurality of segments, i.e., two or more, connected to each other. The segments may be connected to each other in any suitable fashion, e.g., welding, screws, rivets, etc.

Figure 4:
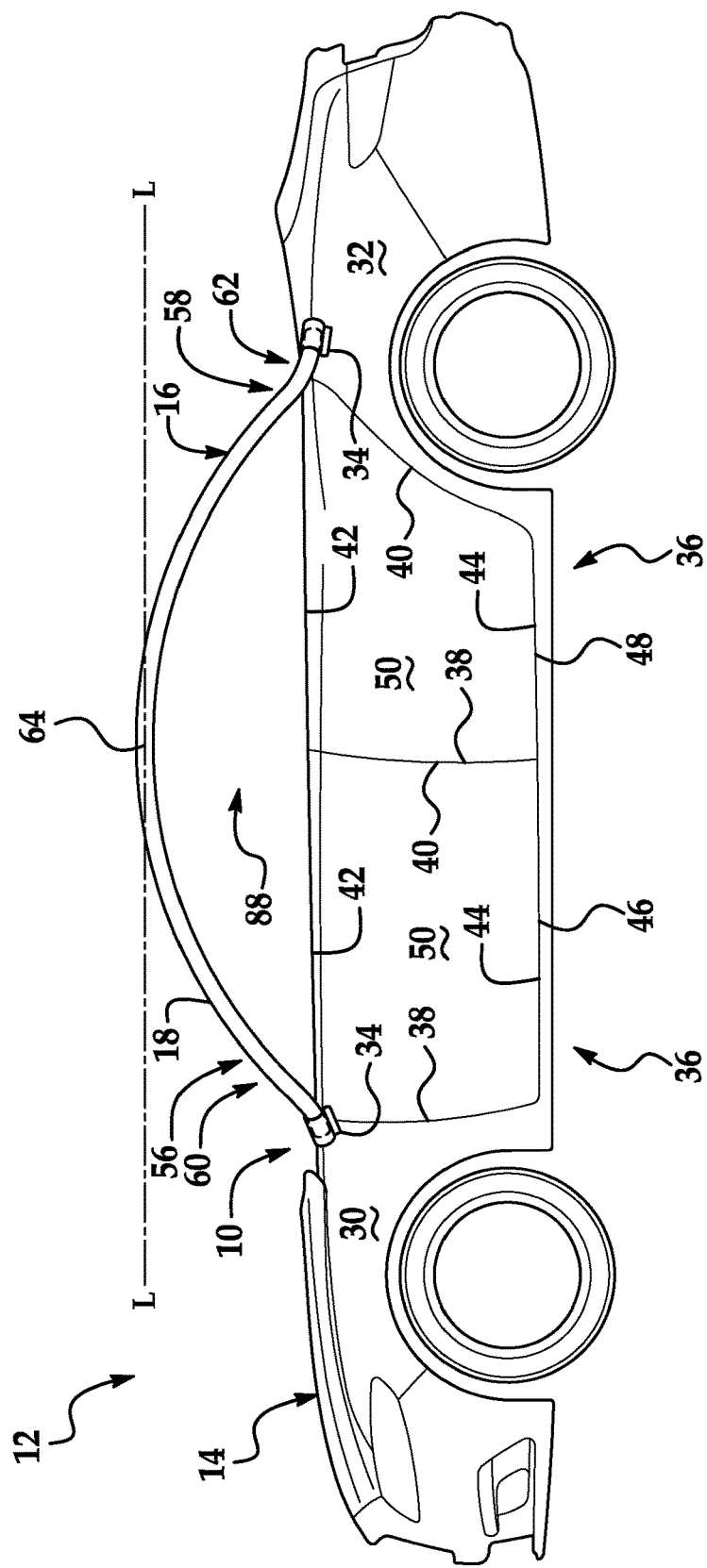
FIG. 4 is a side view of FIG. 2 of one side member of the roof frame including a first end and a second end spaced from the first end along the longitudinal axis.
Figure 5:
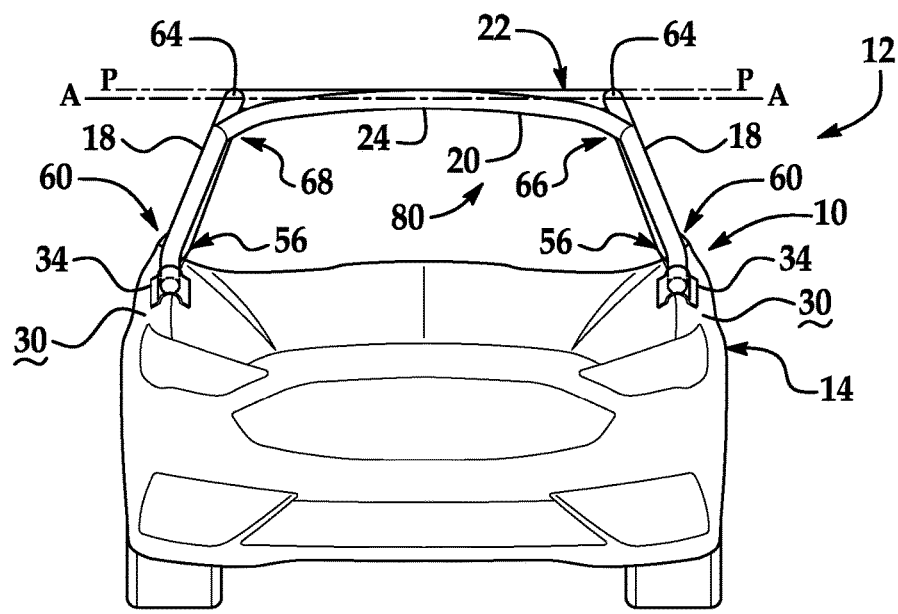
FIG. 5 is a front view of FIG. 2 of the roof frame with the brace generally coplanar with the apex of each side member and the apex of each cross member.

The roof frame 16 may be arched along both the longitudinal axis L and lateral axis A. In other words, each member, e.g., the side members 18 and the cross members 20, of the roof frame 16 may be arched, as set forth below. For example, the roof frame 16 may arch away from the body 14 along the longitudinal axis L, i.e., from the front fender 30 to the rear fender 32, as shown in FIG. 4. In this situation, the roof frame 16 may be spaced farther from the body 14 on the lateral axis A than adjacent to the pillars, e.g., the A-pillar 56 and the C-pillar 58. Additionally, the roof assembly 26 may arch away from the body 14 along the lateral axis A, as shown in FIG. 5. In other words, the roof assembly 26 may be spaced further from the body 14 on the longitudinal axis L than adjacent to the fenders 30, 32, e.g., the front fenders 30 or the rear fenders 32. The roof frame 16 may be arched such that the roof frame 16 may assist with the ingress and/or egress of the occupant into the vehicle 12.

Figure 2:
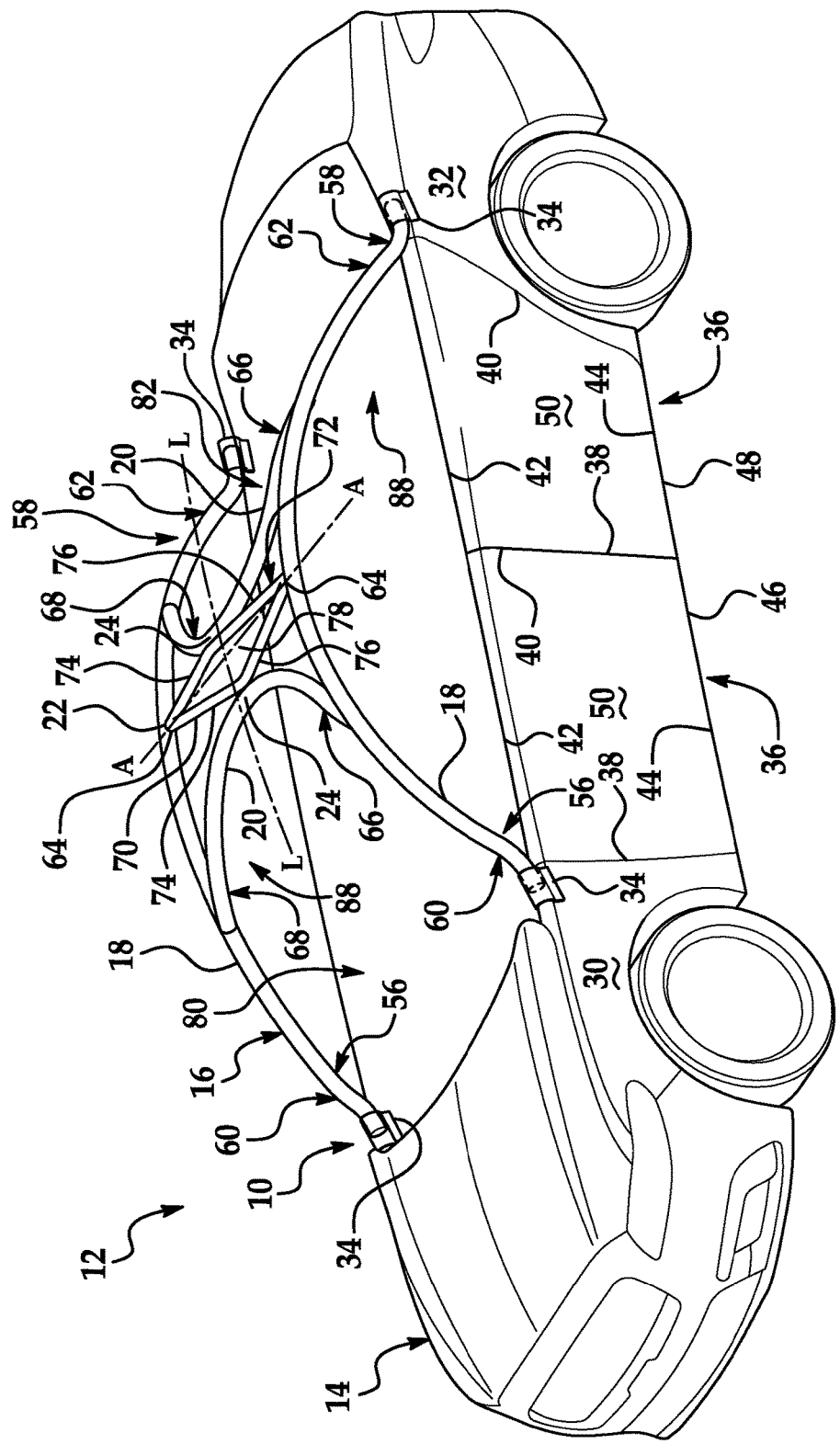
FIG. 2 is a perspective view of the roof frame of the vehicle structure including two side members spaced from each other, two cross members extending from one side member to the other side member, a brace extending from one side member to the other side member, and an apex on each side member and each cross member.
Figure 3:
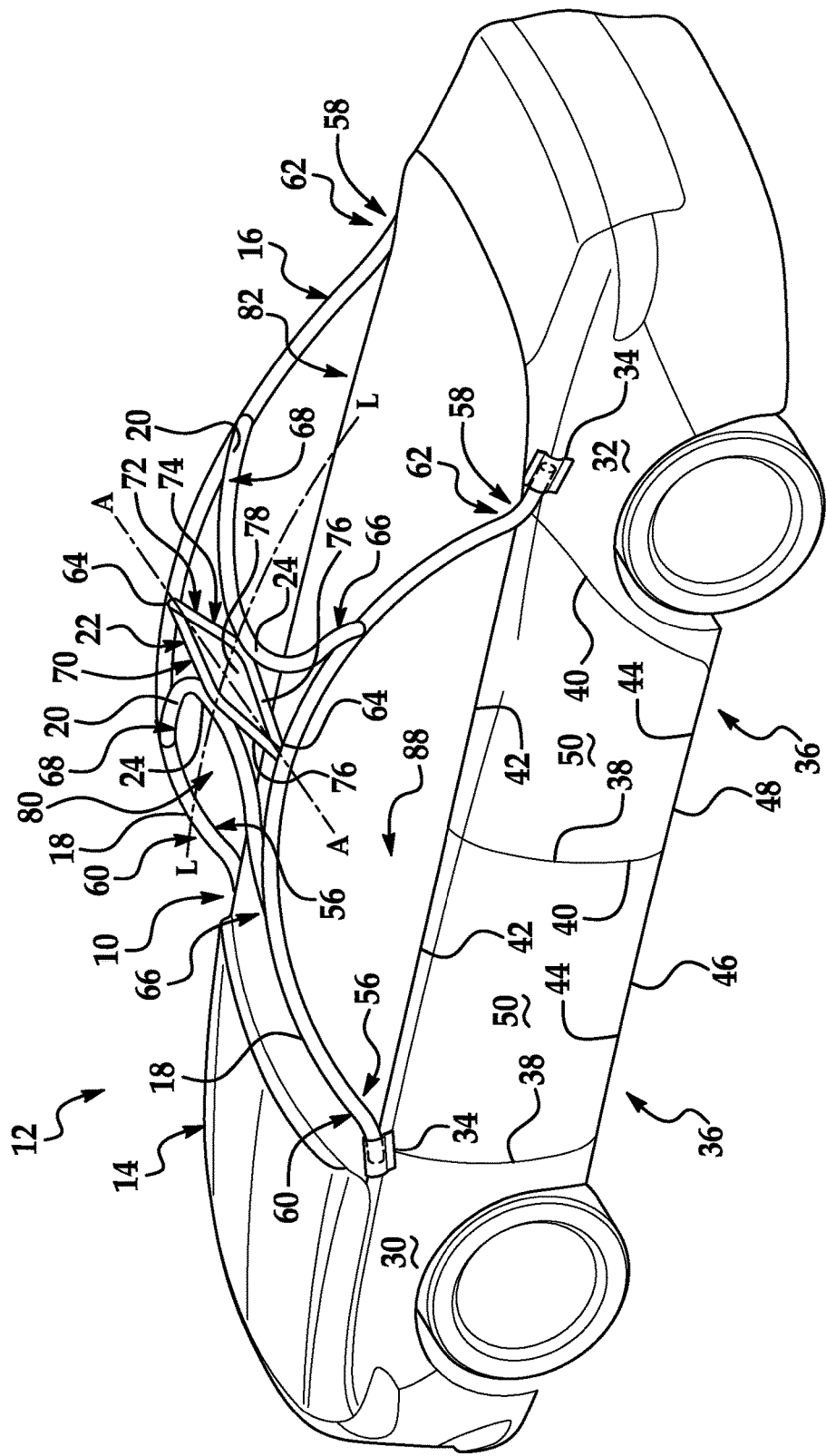
FIG. 3 is a perspective view of FIG. 2 of the roof frame of the vehicle structure.

With reference to FIGS. 2 and 3, the two side members 18 may be spaced from each other along the lateral axis A. For example, one side member 18 may be disposed on one side of the vehicle 12 and the other side member 18 may be disposed on the other side of the vehicle 12. Each side member 18 may be spaced from the longitudinal axis L. Each side member 18 may be elongated along the longitudinal axis L from the front fender 30 to the rear fender 32 on one side or the other side of the vehicle 12, as shown in FIG. 4.

Each side member 18 may include a first end 60 and a second end 62 spaced from the first end 60. The first end 60 of each side member 18 may be the same as the A-pillar 56. The first end 60 of each side member 18 may be disposed adjacent to the front fender 30 of one side or the other side of the vehicle 12, as shown in FIG. 4. Specifically, the first end 60 of each side member 18 may abut and be fixed to the bracket 34 on the front fender 30 on one side or the other side of the vehicle 12.

The second end 62 of each side member 18 may be the same as the C-pillar 58. For example, the second end 62 of each side member 18 may be disposed adjacent to the rear fender 32 of one side or the other side of the vehicle 12, as shown in FIG. 4. As another example, the second end 62 of each side member 18 may be disposed adjacent to the bracket 34 on the rear fender 32 on one side of the vehicle 12.

The side members 18 may each have an arch shape, as shown in FIGS. 2 and 3. Each side member 18 may include an apex 64 disposed between the first end 60 and the second end 62 of the side member 18, as shown in FIGS. 2 and 3. The apex 64 of each side member 18 may be disposed between the front fender 30 and the rear fender 32 of one side or the other side of the vehicle 12.

Figure 6:
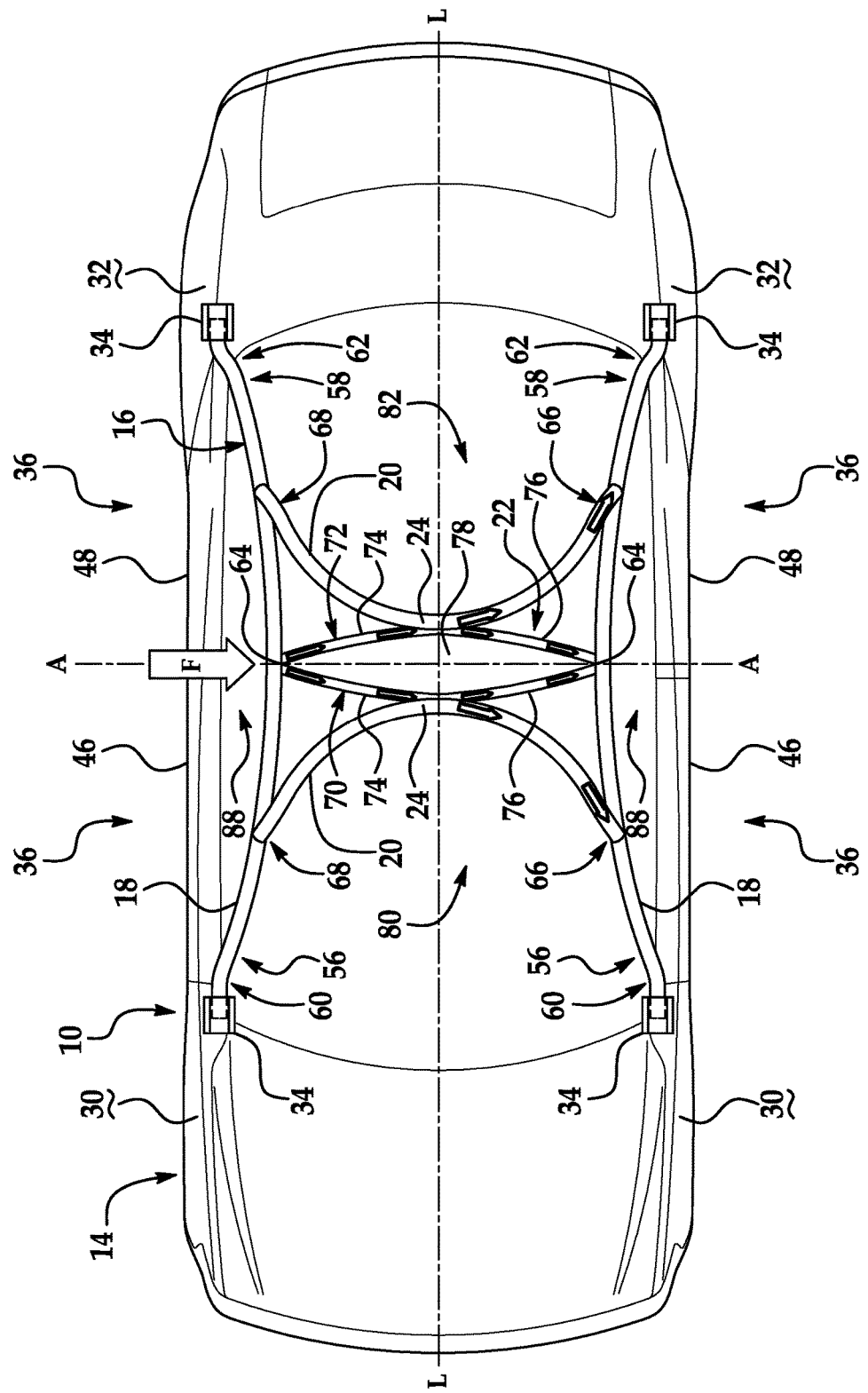
FIG. 6 is a top view of the roof frame including a force distribution from one side member to the other side member through the roof frame when a force is applied along a lateral axis.

The apex 64 of each side member 18 may be disposed between the two cross members 20. The apex 64 of each side member 18 may be disposed on the lateral axis A, as shown in FIG. 6. The apex 64 of each side member 18 may be spaced from the body 14 in a direction transverse to both the longitudinal axis L and the lateral axis A. For example, each side member 18 may extend in a curved path away from each end of the side member 18, i.e., the first end 60 and the second end 62, to the apex 64, as shown in FIG. 4.

With reference to FIG. 6, the two side members 18 may arch towards each other. For example, the apex 64 of each side member 18 may be disposed between the longitudinal axis L and one side or the other side of the vehicle 12. The apex 64 of one side member 18 may be disposed between the longitudinal axis L and one side of the vehicle 12 and the apex 64 of the other side member 18 may be disposed between the longitudinal axis L and the other side of the vehicle 12.

With reference to FIGS. 2 and 3, the two cross members 20 may be spaced from each other along the longitudinal axis L. For example, each cross member 20 may be spaced from the lateral axis A. The two cross member 20 may extend along the lateral axis A from one side member 18 to the other side member 18, as set forth above.

With continued reference to FIGS. 2 and 3, each cross member 20 may include a first end 66 and a second end 68 spaced from the first end 66 along the lateral axis A. The first end 66 of one cross member 20 may be disposed between the front fender 30 of one side of the vehicle 12 and the apex 64 of one side member 18, and the first end 66 of the other cross member 20 may be disposed between the apex 64 of the other side member 18 and the rear fender 32 of one side of the vehicle 12. Additionally, the second end 68 of the one cross member 20 may be disposed between the front fender 30 of the other side of the vehicle 12 and the apex 64 of the other side member 18, and the second end 68 of the other cross member 20 may be disposed between the apex 64 of the other side member 18 and rear fender 32 of the other side of the vehicle 12. One cross member 20, for example, is disposed between the front fenders 30 and the apex 64 of each side member 18, as shown in FIG. 2, and the other cross member 20, for example, is disposed between the apex 64 of each side member 18 and the rear fenders 32, as shown in FIG. 3.

Each cross member 20 may be connected to each side member 18. Specifically, the first end 66 of each cross member 20 may be connected to one side member 18 and the second end 68 of each cross member 20 may be connected to the other side member 18. Each cross member 20, i.e., the first end 66 and the second end 68, may be connected to each side member 18 in any suitable fashion, e.g., welding, screws, bolts, rivets, etc.

The apex 24 of each cross member 20 may be disposed between the first end 66 and the second end 68 of each cross member 20. For example, the apex 24 of each cross member 20 may be disposed on the longitudinal axis L, as shown in FIG. 6. The apex 24 of each cross member 20 may be disposed between the two side members 18, as set forth above. The apex 24 of each cross member 20 may be spaced from the body 14 in a direction transverse to both the longitudinal axis L and the lateral axis A. For example, each cross member 20 may extend in a curved path away from each end of the cross member 20, i.e., the first end 66 and the second end 68, to the apex 24. In other words, the cross members 20 may each have an arch shape, as shown in FIGS. 2 and 3.

As set forth above, the cross members 20 may arch towards each other. For example, the apex 24 of each cross member 20 may be disposed closer to the lateral axis A than the first end 66 and the second end 68 of each cross member 20. In other words, the apex 24 of each cross member 20 may be disposed on the longitudinal axis L between the ends, i.e., the first end 66 and the second end 68, of the cross member 20 and the lateral axis A, as shown in FIG. 6.

With reference to FIGS. 2 and 3, the brace 22 may include a first member 70 connected to the apex 24 of one cross member 20 and a second member 72 connected to the apex 24 of the other cross member 20. Each member 70, 72 of the brace 22 may be connected to the apex 24 of one or the other cross member 20 in any suitable fashion, e.g., welding, screws, bolts, rivets, etc.

With continued reference to FIGS. 2 and 3, each member 70, 72 of the brace 22 may extend from one side member 18 to the other side member 18. For example, each member 70, 72 of the brace 22 may be elongated along the lateral axis A from one side member 18 to the other side member 18. The first member 70 may be partially spaced from the second member 72 along the lateral axis A. In other words, the first member 70 and the second member 72 may be spaced from each other between the two side members 18, e.g., at the apex 24 of each cross member 20. The first member 70 and the second member 72 may converge towards each other at each of the side members 18. For example, the first member 70 and the second member 72 may be connected to each other at each of the side members 18.

With continued reference to FIGS. 2 and 3, each member 70, 72 of the brace 22, i.e., the first member 70 and the second member 72, may include a first leg 74 and a second leg 76 angled relative to each other. For example, the first leg 74 may extend obliquely, i.e., at an angle, from one side member 18 to the apex 24 of one cross member 20, and the second leg 76 may extend obliquely, i.e., at an angle, from the other side member 18 to the apex 24 of one cross member 20. Each leg may extend obliquely, i.e., at an angle, from the apex 64 of one or the other side member 18 to the apex 24 of one or the other cross member 20. The first leg 74 and the second leg 76 of each member 70, 72 meet each other at the apex 24 of one or the other cross member 20. The first leg 74 and the second leg 76 may be unitary, i.e., a continuous one-piece configuration. Alternatively, the first leg 74 and the second leg 76 may be separate components fixed together, e.g., welding, fastening, etc.

With reference to FIG. 6, the first member 70 and the second member 72 of the brace 22 may define a void 78. The void 78 may extend through the brace 22 in a direction transverse to both the longitudinal axis L and the lateral axis A, i.e., in a direction from the roof assembly 26 towards the body 14. The void 78 may have any suitable shape. For example, the void 78 may have a diamond shape. Alternatively, the void 78 may have a parallelogram shape, a rhombus shape, or any other suitable shape.

The brace 22 may be connected to each side member 18. Specifically, each member 70, 72 of the brace 22, i.e., the first member 70 and the second member 72, may be connected to each side member 18. For example, each member 70, 72 of the brace 22, i.e., the first member 70 and the second member 72, may be connected to the apex 64 of each side member 18. In other words, the brace 22 may be connected to the apex 64 of each side member 18. The brace 22, e.g., the first member 70 and the second member 72, may be connected to each side member 18, e.g., the apex 64 of each side member 18, in any suitable fashion, e.g., welding, screws, bolts, rivets, etc.

With reference to FIG. 5, the apexes 64 of the side members 18 and the apexes 24 of the cross members 20 may be generally coplanar with each other. For example, the brace 22 may extend in a plane P (identified in FIG. 5) from the apex 64 of one side member 18 to the apex 64 of the other side member 18 and from the apex 24 of one cross member 20 to the apex 24 of the other cross member 20, e.g., along the lateral axis A and along the longitudinal axis L. In other words, the brace 22 may be generally coplanar with the apexes 64 of the side members 18 and the apexes 24 of the cross members 20.

Each of the cross members 20, side members 18, and the brace 22 may be formed of a same or different type of material. For example, each of the cross members 20, side members 18, and the brace 22 may be formed of metal. As another example, each of the cross members 20, side members 18, and the brace 22 may be formed of aluminum, steel, or any other suitable metal. As yet another example, each of the cross members 20, side members 18, and the brace 22 may be formed of extruded aluminum, aluminum alloys, or any other suitable type of aluminum. Alternatively, each of the cross members 20, side members 18, and the brace 22 may be formed of plastic, fiberglass, carbon fiber, or any other suitable type material.

As set forth above, the roof assembly 26 may be connected to the body 14. For example, each side member 18 of the roof frame 16 may be connected to the bracket 34 of the fenders 30, 32 of one side or the other side of the vehicle 12. In other words, the first end 60 of each side member 18 may be connected to the bracket 34 of the front fender 30 of one side or the other side of the vehicle 12, and the second end 62 of each side member 18 may be connected to the bracket 34 of the rear fender 32 of one side or the other side of the vehicle 12. Alternatively, each side member 18 may be connected to each fender of one side or the other side of the vehicle 12. The roof assembly 26 may be connected to the body 14 in any suitable fashion, e.g., welding, screws, rivets, etc.

With reference to FIG. 1, the roof assembly 26 may define a windshield opening 80 and a backlight opening 82 spaced from the windshield opening 80. The windshield opening 80 may extend from the first end 60 of one side member 18 along the lateral axis A to the first end 60 of the other side member 18. In other words, the windshield opening 80 may extend from the A-pillar 56 on one side of the vehicle 12 to the A-pillar 56 on the other side of the vehicle 12. Additionally, the windshield opening 80 may extend along the longitudinal axis L of the vehicle 12 from the first end 60 of each side member 18, i.e., each A-pillar 56, to one cross member 20, e.g., the apex 24 of one cross member 20. The windshield opening 80 may provide a panoramic, i.e., unobstructed, view from the A-pillar 56 of one side of the vehicle 12 to the A-pillar 56 of the other side of the vehicle 12.

The windshield opening 80 may support a windshield 84 extending across the windshield opening 80. In other words, the windshield 84 may extend along the lateral axis A to each A-pillar 56 and along the longitudinal axis L from the first ends 60 of each side member 18, i.e., each A-pillar 56, to one cross member 20, e.g., the apex 24 of one cross member 20.

With reference to FIG. 1, the backlight opening 82 may extend from the second end 62 of one side member 18 along the lateral axis A to the second end 62 of the other side member 18. In other words, the backlight opening 82 may extend from the C-pillar 58 on one side of the vehicle 12 to the C-pillar 58 on the other side of the vehicle 12. Additionally, the backlight opening 82 may extend along the longitudinal axis L of the vehicle 12 from the second end 62 of each side member 18, i.e., each C-pillar 58, to the other cross member 20, e.g., the apex 24 of the other cross member 20. The backlight opening 82 may be spaced from the windshield opening 80 by the brace 22 along the longitudinal axis L. The backlight opening 82 may provide a panoramic, i.e., unobstructed, view from the C-pillar 58 of one side of the vehicle 12 to the C-pillar 58 of the other side of the vehicle 12.

The backlight opening 82 may support a backlight 86 extending across the windshield opening 80. In other words, the backlight 86 may extend along the lateral axis A to each C-pillar 58 and along the longitudinal axis L from the second ends 62 of each side member 18, i.e., each C-pillar 58, to the other cross member 20, e.g., the apex 24 of one cross member 20.

With reference to FIG. 1, the roof assembly 26 and the body 14 may define a door window opening 88 on each side of the vehicle 12. The door window opening 88 may extend from the A-pillar 56 to the C-pillar 58 along the longitudinal axis L, i.e., from the first end 60 to the second end 62 of one side member 18. Additionally, the door window opening 88 may extend from the top side 42 of the vehicle door 46, 48 to the roof assembly 26, i.e., one side member 18 or the other side member 18. The door window opening 88 may provide a panoramic, i.e., unobstructed, view from the A-pillar 56 to the C-pillar 58.

The glass panel 54 of the vehicle door 46, 48 may extend across the door window opening 88 from the top side 42 of the vehicle door 46, 48 to the roof assembly 26, i.e., one side member 18 or the other side member 18. Additionally, the glass panel 54 of the vehicle door 46, 48 may extend in a direction from the A-pillar 56 to the C-pillar 58. For example, as shown in FIG. 1, the glass panel 54 of the front door 46 may extend from the A-pillar 56 to the rear side 40 of the front door 46, and the glass panel 54 of the rear door 48 may extend from the C-pillar 58 to the front side 38 of the rear door 48.

With reference to FIG. 6, the roof assembly 26, i.e., the roof frame 16, may be subject to a force F during a vehicle impact. Specifically, during a side impact, one of the side members 18 may be subjected to the force F of the vehicle impact. For example, the apex 64 of the side member 18 may be subjected to the force F of the vehicle impact. In this situation, the roof frame 16 may distribute the force F from the apex 64 of one side member 18 to other components of the roof frame 16. For example, the force F may be distributed from the apex 64 of the one side member 18 to the brace 22. In other words, the force F may be split between the first member 70 and the second member 72 of the brace 22. As another example, the force F may be distributed from one leg of each member 70, 72 of the brace 22 to the other leg of each member 70, 72 of the brace 22 and the apex 24 of each cross member 20. In other words, the force F from the first leg 74 of each member 70, 72 of the brace 22 may be split between the second leg 76 of each member 70, 72 of the brace 22 and the apex 24 of each cross member 20. The force F distributed to the second leg 76 of each member 70, 72 of the brace 22 may be distributed to the apex 64 of the other side member 18. As yet another example, the force F may be distributed from each cross member 20 to the other side member 18. In other words, the force F may be distributed from the one cross member 20 to the first end 60 of the other side member 18, i.e., the A-pillar 56, and from the other cross member 20 to the second end 62 of the other side member 18, i.e., the C-pillar 58.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle structure comprising:
   a body;
   a roof frame including two side members spaced from each other and connected to the body;
   two cross members spaced from each other and both extending from one side member to the other side member, the cross members arching toward each other and each having an apex between the side members; and
   a brace connected to the apexes and extending from one side member to the other side member.

2. A vehicle structure according to claim 1, wherein the side members arch toward each other and each includes an apex between the cross members.

3. A vehicle structure according to claim 2, wherein the apexes of the side members are generally coplanar with the apexes of the cross members.

4. A vehicle structure according to claim 3, wherein the brace is generally coplanar with the apexes of the side members and the apexes of the cross members.

5. A vehicle structure according to claim 2, wherein the brace is connected to the apexes of each side member.

6. A vehicle structure according to claim 1, wherein the brace is connected to each side member.

7. A vehicle structure according to claim 1, wherein the brace includes a first member connected to the apex of one cross member and a second member connected to the apex of the other cross member.

8. A vehicle structure according to claim 7, wherein the first member and the second member each extend from one side member to the other side member, and the first member and the second member are connected to each side member.

9. A vehicle structure according to claim 1, wherein the brace is generally coplanar with the apexes of the cross members.

10. A vehicle structure according to claim 1, wherein the cross members are connected to each side member.

11. A roof frame comprising:
    two side members spaced from each other and connected to the body;
    two cross members spaced from each other and both extending from one side member to the other side member, the cross members arching toward each other and each having an apex between the side members; and
    a brace connected to the apexes and extending from one side member to the other side member.

12. A roof frame according to claim 11, wherein the side members arch toward each other and each includes an apex between the cross members.

13. A roof frame according to claim 12, wherein the apexes of the side members are generally coplanar with the apexes of the cross members.

14. A roof frame according to claim 13, wherein the brace is generally coplanar with the apexes of the side members and the apexes of the cross members.

15. A roof frame according to claim 12, wherein the brace is connected to the apex of each side member.

16. A roof frame according to claim 11, wherein the brace is connected to each side member.

17. A roof frame according to claim 11, wherein the brace includes a first member connected to the apex of one cross member and a second member connected to the apex of the other cross member.

18. A roof frame according to claim 17, wherein the first member and the second member each extend from one side member to the other side member, and the first member and the second member are connected to each side member.

19. A roof frame according to claim 11, wherein the brace is generally coplanar with the apexes of the cross members.

20. A roof frame according to claim 11, wherein the cross members are connected to each side member.

* * * * *